(12) United States Patent
Daly et al.

(10) Patent No.: US 7,228,373 B2
(45) Date of Patent: Jun. 5, 2007

(54) SERIAL DIGITAL COMMUNICATION SYSTEM AND METHOD

(75) Inventors: Michael P. Daly, Newtownmountkennedy (IE); Jonathan M. Audy, Los Gatos, CA (US)

(73) Assignee: Analog Devices, Inc., Norwood, MA (US)

( * ) Notice: Subject to any disclaimer, the term of this patent is extended or adjusted under 35 U.S.C. 154(b) by 204 days.

(21) Appl. No.: 11/087,287

(22) Filed: Mar. 22, 2005

(65) Prior Publication Data

US 2005/0216631 A1 Sep. 29, 2005

Related U.S. Application Data

(60) Provisional application No. 60/556,817, filed on Mar. 24, 2004.

(51) Int. Cl.
*G06F 13/00* (2006.01)

(52) U.S. Cl. .................. 710/110; 710/104; 710/305

(58) Field of Classification Search ............... 710/110, 710/104
See application file for complete search history.

(56) References Cited

U.S. PATENT DOCUMENTS

| 5,475,854 | A | * | 12/1995 | Thomsen et al. | 710/23 |
| 5,715,475 | A | * | 2/1998 | Munson et al. | 710/10 |
| 5,793,993 | A | * | 8/1998 | Broedner et al. | 710/106 |
| 6,021,453 | A | * | 2/2000 | Klingman | 710/305 |
| 2006/0039410 | A1 | * | 2/2006 | Ngo | 370/489 |

* cited by examiner

*Primary Examiner*—Glenn A. Auve
(74) *Attorney, Agent, or Firm*—Koppel, Patrick, Heybl & Dawson

(57) ABSTRACT

A communication system includes a master device which communicates with a chain of serially-connected slave devices. The master originates messages, each of which is intended for a particular 'target' slave device. Each message contains a 'distance to target device' value equal to the number of devices between the master and target, and a data packet containing data to be conveyed between the master and target. Each slave device determines if the 'distance to target device' value indicates that it is the target. If not, the slave device increments or decrements the value in real time, with no latency, and transmits the modified message to the next slave device until received by the target device. In one embodiment, the target device may place data in the data packet, and the slave devices are arranged to buffer the data back to the master device.

23 Claims, 2 Drawing Sheets

SERIAL DIGITAL COMMUNICATION SYSTEM AND METHOD

This application claims the benefit of provisional patent application No. 60/556,817 to Daly et al., filed Mar. 24, 2004.

BACKGROUND OF THE INVENTION

1. Field of the Invention

This invention relates to the field of digital communication systems, and particularly to addressing schemes for such systems.

2. Description of the Related Art

Many systems exist for transferring data between peripheral devices and a master device such as a microprocessor. Such systems typically employ a multiple-wire bus structure to which each device is connected, with data transferred between devices either serially or in parallel. To retrieve data from a particular device on the bus, the device must first be addressed or enabled in some fashion. Systems of this type include the SMBus and i²c bus systems.

However, such systems require each device to have a unique address or unit number that is configured in hardware. This can be expensive, as it requires each device to have the necessary hardware interface (e.g., dedicated I/O pins on the device). These costs can be unacceptably high, particularly for simple devices that would otherwise be small and inexpensive.

Another addressing approach is found in a system known as the serial peripheral interface (SPI). The SPI is a full duplex, four wire synchronous serial interface based on a master/slave relationship. However, the SPI requires that each interconnected device have a pin by which the device is enabled prior to transferring data; this increases processing overhead and the system's I/O requirements. The system also requires 4 wires, which may consume more area than is desired.

SUMMARY OF THE INVENTION

A system and method for effecting serial digital communication is presented, which overcomes the problems noted above. The present system requires just one wire, and none of the communicating devices requires an address.

The present scheme includes a master device having an input/output (I/O) node for sending and receiving messages to and from a chain of serially-connected slave devices. Each slave device has a first node and a second node, with the first node of the first slave device in the chain connected to the master device's I/O node, and the second node of each slave device connected to the first node of the subsequent slave device in the chain.

The master device is arranged to originate messages, each of which is intended for a respective one of the slave devices—referred to herein as the 'target' slave device or simply the 'target device'. Each message includes:
a 'distance to target device' value which represents the number of slave devices between the master device and the target device; and
a data packet containing data to be conveyed between the master device and the target device.
Each of the slave devices is arranged to:
receive messages originated by the master device at its first node;
determine if a message's 'distance to target device' value is equal to a pre-selected 'target address' value which indicates that the slave device is the target device. When a slave device determines that it is not the target device, it is arranged to:
increment or decrement the 'distance to target device' value; and
transmit the modified message to its second node. When the slave device determines that it is the target device, it is arranged to receive the data in the data packet. The increment or decrement function is preferably performed in real time, with no latency.

In a preferred embodiment, slave devices are further arranged to passively buffer data received at their second nodes back to their first nodes, and if a slave device is the target device, it may place data in the data packet—which is passively buffered back to the master device via the target device's first node and the previous slave devices. The system is preferably arranged such that a message is originated and data is passively buffered back to the master device with no latency.

The system may be arranged such that the master device communicates with multiple slave device chains, in which case the system further includes a means of identifying the chain which includes the target device. Several other variations are described, including an arrangement wherein the data packet of a message includes addressing information specific to the target slave device, and systems wherein the master and slave devices each receive a clock signal.

Further features and advantages of the invention will be apparent to those skilled in the art from the following detailed description, taken together with the accompanying drawings.

DETAILED DESCRIPTION OF THE INVENTION

Figure 1:
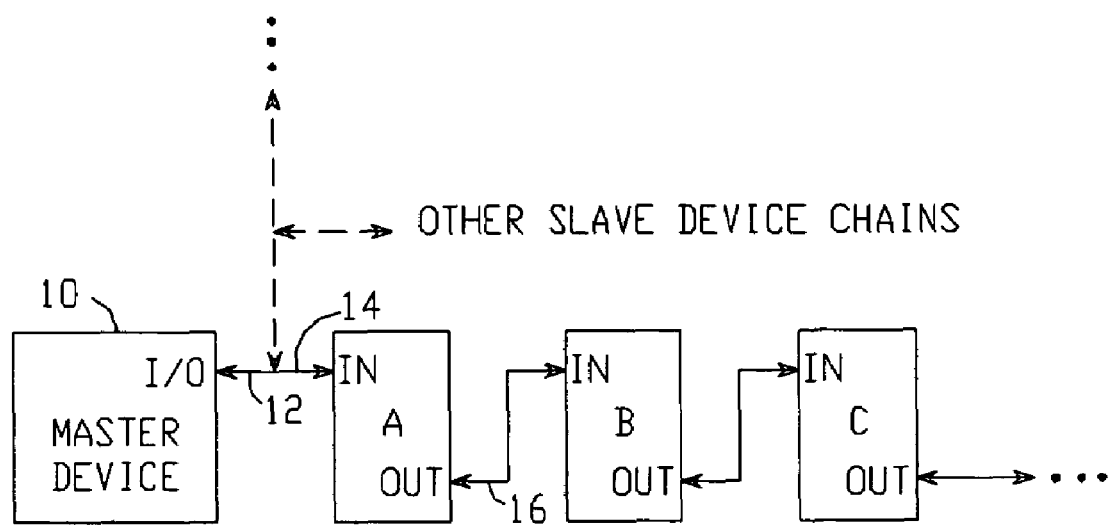
FIG. 1 is a block diagram of a serial digital communication system per the present invention.

A serial digital communication system per the present invention is shown in FIG. 1. A master device 10, such as a microprocessor or microcontroller, has an input/output (I/O) node 12 for sending and receiving messages to and from one or more 'slave' devices. The slave devices (device A, device B, device C, . . . ) are serially connected to form a chain. Each slave device has at least a first node (14) and a second node (16): the first node 14 of the first slave device in the chain (device A) is connected to the master device's I/O node 12, and the second node of each slave device is connected to the first node of the subsequent slave device in the chain. Though the first and second nodes are labeled "IN" and "OUT", respectively, each preferably operates bi-directionally—i.e., the master and slave devices are preferably arranged such that each node supports bi-directional communication.

Figure 2:
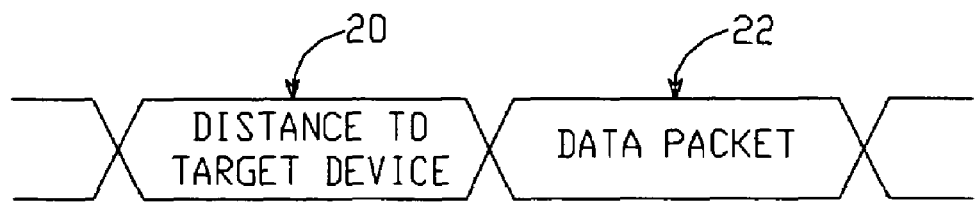
FIG. 2 is a timing diagram illustrating the operation of the system of FIG. 1.

The master device is arranged to originate messages, each of which is intended for a respective 'target' slave device. The master device must have full knowledge of the slave device chain with which it wants to communicate, including the number of devices in the chain, and their respective functions. The addressing scheme provided by the present invention requires messages sent by master device 10 to have the components shown in the timing diagram of FIG. 2. Each message includes:

- a 'distance to target device' value (20) which represents the number of slave devices between master device 10 and a target slave device. For example, if the target device is device C—i.e., the third device from master device 10, the 'distance to target device' value will represent the number 3.
- a data packet (22) containing data to be conveyed between the master and target devices. The packet may be any length required by the application, as long as the length is known to all devices on the bus. Note that messages sent by master device 10 may have components in addition to required components 20 and 22.

To enable communication between master device 10 and a specific target device, each slave device is arranged to modify the bit stream received at its first node by performing an 'increment' or a 'decrement' function on the 'distance to target device' value and passing the result onto its second node and thus onto the next slave device in the chain. The increment or decrement function is performed in real time, with no latency (less than one clock cycle). This is possible because addition and subtraction are mathematically 'serial' operations in nature, such that the function of incrementing or decrementing can be performed as each bit arrives, without first having to buffer the entire number to be operated on. Once operated on, each bit can be immediately transferred to the next slave device in the chain, where again, it can be immediately operated on. This technique ensures that each slave device in the serial chain receives a different message and therefore can be addressed uniquely.

Each slave device is arranged to monitor the 'distance to target device' value of each message received at its first node, and to determine that it is the target device when the received value is equal to a pre-selected 'target address' value which can be any chosen, fixed number. The system is arranged such that each slave device increments or decrements the 'distance to target device' value by a pre-selected fixed number. For simplicity, the 'distance to target device' value is preferably incremented or decremented by one, and the target address value is preferably one or zero.

For example, assuming that master device 10 sets the 'distance to target device' value equal to the number of slave devices between the master device and the target device, that the function performed by each slave device is a decrement which reduces the 'distance to target device' value by one, and that the target address value is one, a slave device determines that it is the target device when the 'distance to target device' value in a received message is equal to one.

When a slave device has received a message and determined that it is not the target device, it operates on the message's 'distance to target device' value and passes the modified message onto the next device in the chain. When a slave device has received a message and determined that it is the target device, it receives the data in the message's data packet.

In a preferred embodiment, slave devices are further arranged to passively buffer data received at their second nodes back to their first nodes. If a slave device is the target device, it may place data in the data packet portion of the message, which is then passively buffered back to master device 10 via the target device's first node and the previous slave devices. Note that it is not essential that data be returned to the master device in this way; many other schemes could be employed, such as, for example, the use of a separate 1-bit data bus that connects to each slave device and the master device.

Thus, for the example above in which the target device is device C, and again assuming that the function performed by each slave device is a decrement by one and that the target address value is one, master device 10 originates a message at its I/O node 12, with the message's 'distance to target device' value set to '3'. Device A receives the message at its first node 14, notes that the 'distance to target device' value is not equal to one, decrements the value to '2', and passes the modified message onto its second node 16. Device B does the same thing, decrementing the 'distance to target device' value to '1'. Device 3 receives the message at its first node, and notes that the 'distance to target device' value is 1 and that therefore it is the target device. It responds by actively receiving the data in the data packet portion of the message, or may, if configured in accordance with the preferred embodiment described above, place data into the data packet portion. Data placed into the data packet portion is passively buffered back to master device 10 via device C's first node, from device B's second node to its first node, from device A's second node to its first node, and finally to the master device's I/O node 12.

The system is preferably arranged such that a message originated by the master device is received by each slave device in the chain, and (if applicable) data is passively buffered back to the master device, with no latency.

Each device is identified solely by its position in the chain. Hence, any slave device in the chain may be addressed and communicated with, without needing a unique address, or dedicated address pins—thereby enabling efficient communication between serially-connected devices and a master device, or to a parallel communication bus.

The system may be arranged such that a master device can communicate with multiple slave device chains, as illustrated in FIG. 1. When so arranged, a means of identifying the chain which includes the target device must be provided. One way of accomplishing this is to include a 'chain address' portion in messages originated by the master device, which would include the hardware address of the first slave device in the chain containing the target device (as illustrated in the timing diagram shown in FIG. 4).

Figure 3:
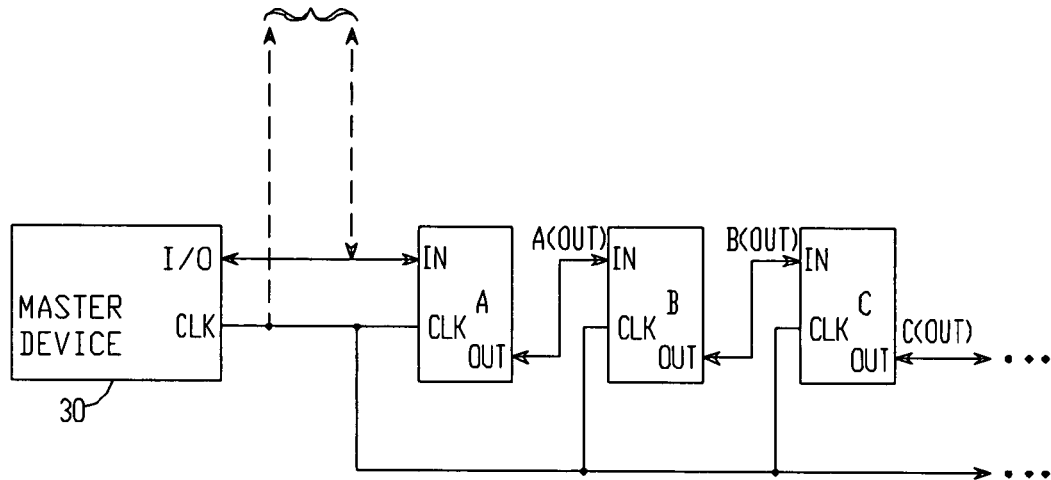
FIG. 3 is a block diagram of another possible embodiment of a serial digital communication system per the present invention.

Another embodiment of the present system is shown in FIG. 3. Here, master device 30 and each of the serially-connected slave devices receives a clock signal (CLK). This is a requirement of some bus protocols, such as SMBus and $i^2c$. However, the use of a clock signal does not affect the addressing scheme provided by the present invention. Note that protocols such as SMBus and $i^2c$ might also require that each message include a part-specific address portion. To conform to message specifications of this sort, the present system's 'distance to target device' value could be inserted into the part-specific address portion of each message. As such, the present invention makes possible a communication system which includes very small slave devices with few I/O pins, which can be communicated with via protocols such as SMBus and $i^2c$—without having to abide by the device number limits found in the SMBus and $i^2c$ specifications.

Figure 4:
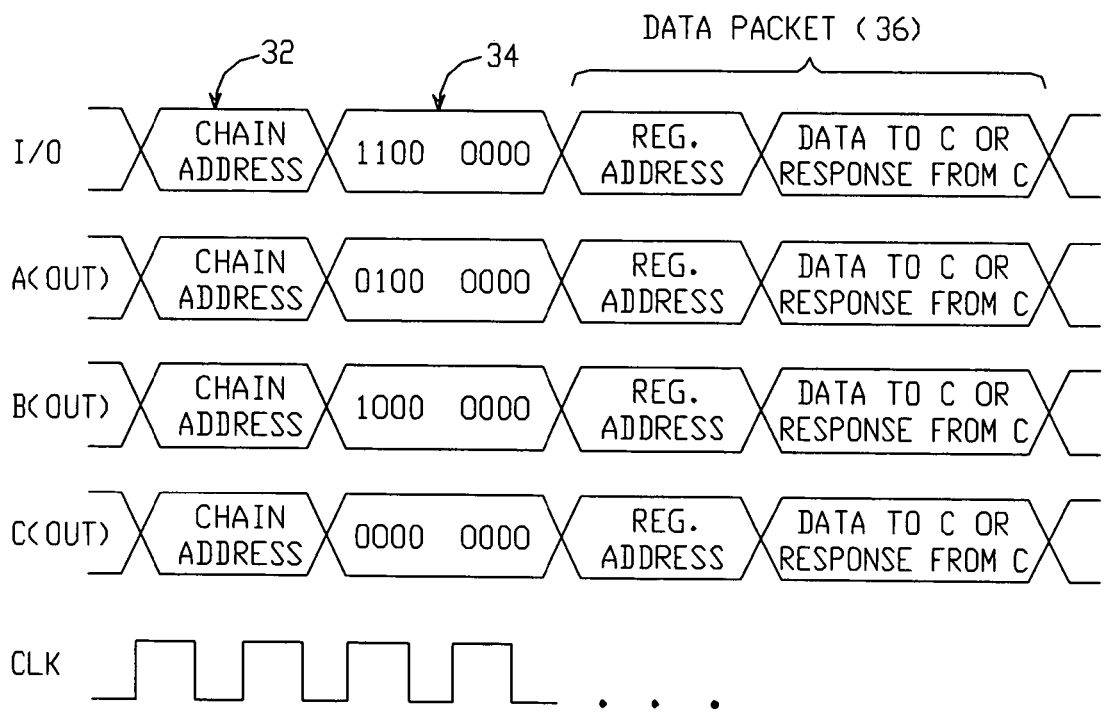
FIG. 4 is a timing diagram illustrating the operation of the system of FIG. 3.

As noted above, master device 30 (and clock signal CLK) may be connected to other slave device chains; when so arranged, the system requires a means of identifying the chain which includes the target device—such as by including a 'chain address' in each message as described above (and as illustrated in the timing diagram shown in FIG. 4).

The components of a message as might be employed by the system of FIG. 3 are shown in the timing diagram of FIG. 4. Here, each message includes:

- a 'chain address' (32) which would include, for example, the hardware address of the first slave device in the chain containing the target device.
- a 'distance to target device' value (34) which represents the number of slave devices between master device 30 and the target device.
- a data packet (36) containing data to be conveyed from the master device to the target device. The system might also be arranged such that data may be conveyed from target device to master device via data packets which are passively buffered back to the master via the intervening slave devices, as described above.

As noted above, the incrementing or decrementing of the 'distance to target device' value is preferably performed in real time, with less than one clock cycle latency. This may be difficult to implement. A preferred approach is to encode the 'distance to target device' value in bit reversed binary form. When so arranged, the hardware required to decrement the value with zero clock cycle delays can be implemented with a small number of components.

In some applications, in addition to sending a message to a particular target device, it may be necessary to provide additional addressing information specific to that target device. This might be accomplished by, for example, allocating some of a message's data packet portion for additional device-specific addressing information, such as a register address. This is illustrated in FIG. 4.

FIG. 4 also provides a detailed look at a typical communication between master device 30 and a target device; in the example shown, the target device is device C, the function performed by each slave device is a decrement by one, the target address value is one, and data may be conveyed from a target device to the master device via data packets which are passively buffered back to the master via the intervening slave devices. The message is shown at four different points: at the master device's I/O node, and at the OUT nodes of devices A, B, and C (A(OUT), B(OUT), C(OUT)).

The 'distance to target device' value is shown in bit reversed binary form. Thus, with device C being the target device, the 'distance to target device' value at the master device's I/O node is given as "1100 0000" (assuming an 8-bit protocol). The 'data packet' portion of the message includes a register address (if applicable), and either 1) data intended for receipt by device C, or 2) data placed into the 'data packet' portion by device C in response to the message, which has been passively buffered back from device C to master device 30 via device C's first node and slave devices B and A.

Device A receives the message described above at its first node, and analyzes the 'distance to target device' value to determine if it is the target device. Since it is not, device A decrements the 'distance to target device' value by one (to '0100 0000'), and transmits the modified message (A(OUT)) to its second node and onto device B. Data in the message's 'data packet' portion is essentially ignored by device A, which passes on such data to device B, or passively buffers data received at its second node back to its first node and thus to master device 30.

Similarly, device B receives the message described above at its first node, determines that it is not the target device and decrements the 'distance to target device' value by one (to '1000 0000'), and transmits the modified message (B(OUT)) to its second node and onto device C. Device B passes on data in the message's 'data packet' portion to device C, or passively buffers data received at its second node back to its first node and thus to device A.

Device C receives the message at its first node, analyzes the 'distance to target device' value, and determines that, since the value is equal to the target address value of one, it is the target device. Device C still decrements the 'distance to target device' value by one (to '0000 0000') so that devices downstream from device C know that they are not the target device. If appropriate, data in the message's 'data packet' portion is received by device C. If the message calls for a response from device C, device C places the requested data into the message's 'data packet' portion; this data is then passively buffered back to master device 30 via device C's first node and devices B and A.

Note that the particular implementations and message structures shown are merely exemplary. A communication scheme in accordance with the present invention only requires that the slave devices be serially connected, that messages include a 'distance to target device' value which is decremented by each non-target slave device, and that each slave device be capable of passively buffering data from the target device back to the master device.

While particular embodiments of the invention have been shown and described, numerous variations and alternate embodiments will occur to those skilled in the art. Accordingly, it is intended that the invention be limited only in terms of the appended claims.

We claim:

1. A serial digital communication system, comprising:
   a master device having an input/output (I/O) node for sending messages to a chain of slave devices; and
   a plurality of slave devices connected serially to form a chain extending from a first slave device to a last slave device, each slave device after said first slave device being subsequent to the slave device immediately preceding it in said chain, each of said slave devices having a first node and a second node, the first node of the first slave device in said chain connected to said master device's I/O node, the second node of each slave device connected to the first node of the subsequent slave device in said chain except for the last slave device in said chain, the second node of which is left unconnected;
   said master device arranged to originate messages, each of which is sent to a respective one of said slave devices, each of said messages comprising:
   a 'distance to target device' value which represents the number of slave devices between said master device and the target slave device, and
   a data packet containing data to be conveyed between said master device and said target slave device;
   each of said slave devices arranged to:
   receive a message originated by said master device at its first node,
   determine if the 'distance to target device' value in said message is equal to a pre-selected target address value which indicates that said slave device is the target device, and when said slave device is not the target device:
      increment or decrement the 'distance to target device' value by a pre-selected fixed number, and
      transmit the modified message to said second node;
   and when said slave device is the target device:
      receive the data in said data packet.

2. A serial digital communication system, comprising:
a master device having an input/output (I/O) node for sending and receiving messages to and from a chain of slave devices; and
a plurality of slave devices connected serially to form a chain extending from a first slave device to a last slave device, each slave device after said first slave device being subsequent to the slave device immediately preceding it in said chain, each of said slave devices having a first node and a second node, the first node of the first slave device in said chain connected to said master device's I/O node, the second node of each slave device connected to the first node of the subsequent slave device in said chain except for the last slave device in said chain, the second node of which is left unconnected;
said master device arranged to originate messages, each of which is sent to a respective one of said slave devices, each of said messages comprising:
a 'distance to target device' value which represents the number of slave devices between said master device and the target slave device, and
a data packet containing data to be conveyed between said master device and said target slave device;
each of said slave devices arranged to:
receive a message originated by said master device at its first node,
determine if the 'distance to target device' value in said message is equal to a pre-selected target address value which indicates that said slave device is the target device, and when said slave device is not the target device:
increment or decrement the 'distance to target device' value by a pre-selected fixed number,
transmit the modified message to said second node, and
passively buffer data received at said second node to said first node;
and when said slave device is the target device:
receive the data in said data packet and/or place data in said data packet, data placed in said data packet passively buffered back to said master device via said target device's first node and said previous slave devices.

3. The system of claim 2, wherein said messages comprise bit streams, the bits of which are sent from said master device in synchronization with a clock signal, wherein a message is originated, received by each slave device in said chain, and data is passively buffered back to said master device with a latency of less than one clock cycle.

4. The system of claim 2, wherein said master device is arranged to communicate with multiple slave device chains, said system further comprising a means of identifying the chain which includes the target device.

5. The system of claim 4, wherein each of said slave devices has an associated hardware address and each of said messages further comprises the hardware address of the first slave device in the chain containing the target slave device.

6. The system of claim 2, wherein the data packet of a message includes addressing information specific to said target slave device.

7. The system of claim 2, wherein the 'distance to target device' value is encoded in bit reversed binary form.

8. The system of claim 2, wherein said system further includes a clock signal, each of said master and slave devices arranged to receive said clock signal.

9. The system of claim 2, wherein said system complies with a message protocol which requires an address portion, said 'distance to target device' value inserted into said address portion.

10. The system of claim 2, wherein said system is arranged to comply with the SMBUS and $i^2$ c communication protocols.

11. The system of claim 2, wherein each slave device is arranged to decrement the 'distance to target device' value in a message by one, and to determine that it is the target device when the 'distance to target device' value in a message received at its first node is one.

12. The system of claim 2, wherein each slave device is arranged to decrement the 'distance to target device' value in a message by one, and to determine that it is the target device when the 'distance to target device' value in a message received at its first node is zero.

13. A serial digital communication system, comprising:
a master device having an input/output (I/O) node for sending and receiving messages to and from one or more chains of slave devices;
each chain of slave devices comprising a plurality of slave devices connected serially and extending from a first slave device to a last slave device, each slave device after said first slave device being subsequent to the slave device immediately preceding it in said chain, each of said slave devices having a first node and a second node, the first node of the first slave device in said chain connected to said master device's I/O node, the second node of each slave device connected to the first node of the subsequent slave device in said chain except for the last slave device in said chain, the second node of which is left unconnected;
said master device arranged to originate messages, each of which is sent to a respective one of said slave devices, each of said messages comprising:
the hardware address of the first slave device in the chain containing the target slave device,
a 'distance to target device' value which represents the number of slave devices between said master device and the target slave device, and
a data packet containing data to be conveyed between said master device and said target slave device;
each of said slave devices arranged to:
receive a message originated by said master device at its first node,
determine if the 'distance to target device' value in said message is equal to a pre-selected target address value which indicates that said slave device is the target device, and when said slave device is not the target device:
increment or decrement the 'distance to target device' value by a pre-selected fixed number,
transmit the modified message to said second node, and
passively buffer data received at said second node to said first node;
and when said slave device is the target device:
receive the data in said data packet and/or place data in said data packet, data placed in said data packet passively buffered back to said master device via said target device's first node and said previous slave devices;
wherein said messages comprise bit streams, the bits of which are sent from said master device in synchronization with a clock signal, said system arranged such that messages are originated, received by each slave device in said chain, and data is passively buffered back to said master device with a latency of less than one clock cycle.

14. The system of claim 13, wherein the 'distance to target device' value in a message is encoded in bit reversed binary form.

15. The system of claim 13, wherein each slave device is arranged to determine that it is the target device when the 'distance to target device' value in a message received at its first node is one.

16. The system of claim 13, wherein each slave device is arranged to determine that it is the target device when the 'distance to target device' value in a message received at its first node is zero.

17. The system of claim 13, wherein each slave device is arranged to, when said slave device is not the target device, decrement the 'distance to target device' value by said pre-selected fixed number.

18. A method of addressing a chain of serial-connected slave devices, comprising:
   forming a chain of slave devices, the first slave device in said chain coupled to a master device;
   originating, with said master device, a message intended for a 'target' slave device, said message comprising:
      a 'distance to target device' value which represents the number of slave devices between said master device and the target slave device, and
      a data packet containing data to be conveyed between said master device and said target slave device;
   receiving, by each of said slave devices between said master device and at least said target slave device, said message;
   analyzing said 'distance to target device' value to determine whether it is equal to a pre-selected target address value which indicates whether said slave device is the target slave device;
   incrementing or decrementing said 'distance to target device' value and retransmitting said modified message to the next slave device in said chain when said slave device is not said target slave device; and
   receiving the data in said data packet when the slave device which receives the message is said target slave device.

19. The method of claim 18, wherein said messages comprise bit streams, the bits of which are sent from said master device in synchronization with a clock signal, wherein a message is originated and received by said slave devices between said master device and at least said target slave device with a latency of less than one clock cycle.

20. The method of claim 18, wherein said master device is arranged to communicate with multiple slave device chains and each of said slave devices has an associated hardware address, said message further comprising the hardware address of the first slave device in the chain containing the target slave device.

21. The method of claim 18, wherein said 'distance to target device' value is encoded in bit reversed binary form.

22. The method of claim 18, further comprising:
   placing data in said data packet when the slave device within said chain of slave devices is determined to be said target slave device; and
   passively buffering data placed in said data packet back to said master device via the intervening slave devices.

23. The method of claim 22, wherein said messages comprise bit streams, the bits of which are sent from said master device in synchronization with a clock signal, wherein a message is originated, received by each slave device in said chain, and data is passively buffered back to said master device with a latency of less than one clock cycle.

* * * * *